United States Patent
Chen et al.

(10) Patent No.: US 12,355,792 B2
(45) Date of Patent: Jul. 8, 2025

(54) STRATEGICALLY AGED DOMAIN DETECTION

(71) Applicant: Palo Alto Networks, Inc., Santa Clara, CA (US)

(72) Inventors: Zhanhao Chen, Sunnyvale, CA (US); Daiping Liu, Sunnyvale, CA (US); Wanjin Li, Santa Clara, CA (US); Fan Fei, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 121 days.

(21) Appl. No.: 18/072,485

(22) Filed: Nov. 30, 2022

(65) Prior Publication Data
US 2024/0179164 A1   May 30, 2024

(51) Int. Cl.
*H04L 29/06* (2006.01)
*H04L 9/40* (2022.01)

(52) U.S. Cl.
CPC ...... *H04L 63/1425* (2013.01); *H04L 63/1416* (2013.01); *H04L 63/1483* (2013.01)

(58) Field of Classification Search
CPC ............. H04L 63/1425; H04L 63/1416; H04L 63/1483; H04L 61/302; H04L 61/4511; H04L 63/1408; H04L 63/145
See application file for complete search history.

(56) References Cited

U.S. PATENT DOCUMENTS

| | | | | |
|---|---|---|---|---|
| 10,178,121 B2* | 1/2019 | Klatt | .................... | H04L 63/1441 |
| 10,686,814 B2* | 6/2020 | Arnell | ................. | H04L 61/4511 |
| 10,944,781 B1* | 3/2021 | Bilge | ...................... | G06F 17/18 |
| 2014/0250524 A1* | 9/2014 | Meyers | ............... | H04L 61/4511 |
| | | | | 726/22 |
| 2019/0012456 A1* | 1/2019 | Moore | .................. | G06F 21/554 |
| 2019/0068624 A1* | 2/2019 | Compton | ............ | H04L 63/1441 |
| 2021/0099414 A1* | 4/2021 | Liu | ......................... | H04L 63/20 |

OTHER PUBLICATIONS

Gao et al., "Reexamining DNS From a Global Recursive Resolver Perspective", IEEE/ACM Transactions on Networking, vol. 24, Issue: 1, (Year: Feb. 2016).*
He et al., Mining DNS for Malicious Domain Registrations, 6th International Conference on Collaborative Computing: Networking, Applications and Worksharing, 2010.
Spooren et al., PREMADOMA: An Operational Solution for DNS Registries to Prevent Malicious Domain Registrations, 2019 Annual Computer Security Applications Conference, Dec. 2019.
(Continued)

*Primary Examiner* — Morshed Mehedi
(74) *Attorney, Agent, or Firm* — Van Pelt, Yi & James LLP

(57) ABSTRACT

Detection of strategically aged domains is detected. A list of aged dormant domains is determined, including by evaluating passive Domain Name System (DNS) information. The list of aged dormant domains is monitored for a change by an aged dormant domain from a dormant domain status to an active status. In response to determining the change to active status of the aged dormant domain, an action is taken with respect to the aged dormant domain.

23 Claims, 13 Drawing Sheets

(56) References Cited

OTHER PUBLICATIONS

Huang, Caiyun et al. SFDS: A Self-Feedback Detection System for DNS Hijacking Based on Multi-Protocol Cross Validation 26th International Conference on Telecommunications (ICT), IEEE, XP033596542, DOI: 10.1109/ICT.2019.8798832, [retrieved on Aug. 13, 2019].

Suwa et al., DNS Resource Record Analysis of URLs in E-Mail Messages for Improving Spam Filtering, 2011 IEEE/IPSJ International Symposium on Applications and the Internet, Aug. 30, 2011.

* cited by examiner

```
var s = document.URL;

if (s.indexOf("ts3") > 0) {
  self.location = "https://         .        "
} else {
  self.location = "https://              .    "
}
```

FIG. 10

STRATEGICALLY AGED DOMAIN DETECTION

BACKGROUND OF THE INVENTION

Nefarious individuals attempt to harm computer systems in a variety of ways. As one example, such individuals may embed or otherwise include malicious software ("malware") in email attachments and transmit (or cause the malware to be transmitted) to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. Such compromised computers can be used to perform a variety of tasks (e.g., initiating attacks against other systems). Unfortunately, attackers continue to adapt their techniques to evade detection. Accordingly, there exists an ongoing need for improved approaches to detecting malicious computer activities and preventing harm to computer systems.

BRIEF DESCRIPTION OF THE DRAWINGS

Various embodiments of the invention are disclosed in the following detailed description and the accompanying drawings.

FIG. 10 illustrates a portion of a cloaking script.

DETAILED DESCRIPTION

Figure 1A:
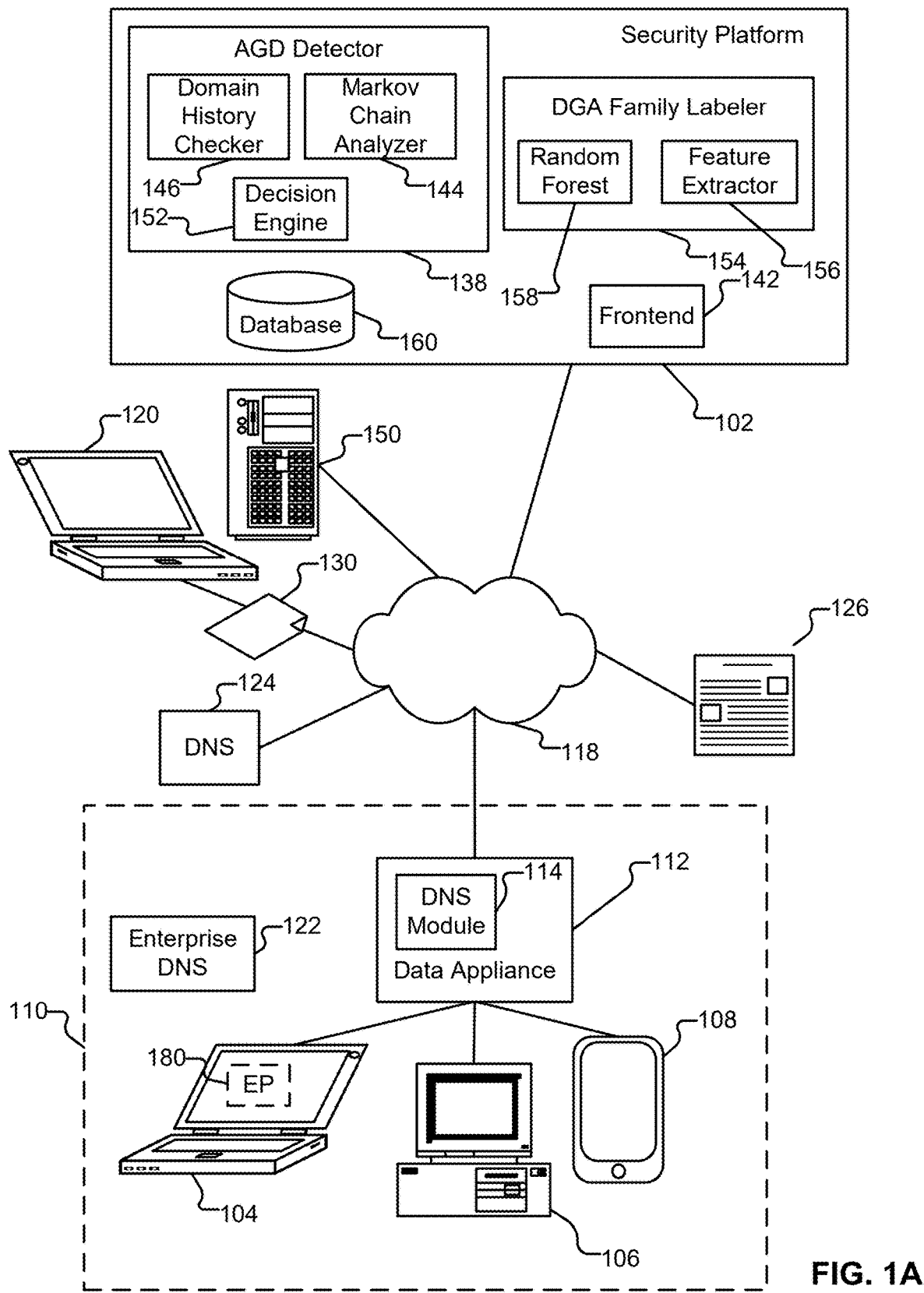
FIG. 1A illustrates an example of an environment in which malicious use of strategically aged domains is detected and the harm posed by such domains reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. OVERVIEW

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes, dynamically feeding that context into security policies, thereby eliminating the policy lag that may occur when VMs change.

II. Example Environment

FIG. 1A illustrates an example of an environment in which malicious use of strategically aged domains is detected and the harm posed by such domains reduced. Using techniques described herein, DNS record query information is used to identify servers (also referred to herein as "attack domains") that exploit the design of recursive resolvers, e.g., to launch distributed denial of service (DDOS) attacks. Identification of attack domains can be used in a variety of beneficial ways. As one example, a list of attack domains can be provided to firewalls, intrusion detection systems, intrusion prevention systems, or other appropriate appliances. If a client device protected by such an appliance performs DNS queries that correspond to an attack domain, such behavior can be treated as suspicious/malicious by the appliance, and remedial actions can be taken.

In the example environment shown in FIG. 1A, client devices 104-108 are a laptop computer, a desktop computer, and a tablet (respectively) present in an enterprise network 110 (belonging to the "ACME Company"). Data appliance 112 is configured to enforce policies regarding communications between clients, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, appliance 112 is also configured to enforce policies with respect to traffic that stays within enterprise network 110.

Although illustrated as a single element in FIG. 1A, enterprise network 110 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1A as connecting directly to data appliance 112, it is to be understood that one or more intermediate nodes (e.g., routers, switches, and/or proxies) can be and typically are interposed between various elements in enterprise network 110.

Appliance 112 can take a variety of forms. For example, appliance 112 can comprise a dedicated device or set of devices. The functionality provided by appliance 112 can also be integrated into or executed as software on a general purpose computer, a computer server, a gateway, and/or a network/routing device. In some embodiments, services provided by data appliance 112 are instead (or in addition) provided to client device 104 by software executing on client device 104.

In the example shown in FIG. 1A, a malicious individual (using system 120) has created malware 130. The malicious individual hopes that a client device, such as client device 104, will execute a copy of malware 130, compromising the client device and, for example, causing the client device to become a bot in a botnet. The compromised client device can then be instructed to perform tasks (e.g., participating in DDOS attacks) and to report information to an external entity, such as command and control (C&C) server 150, as well as to receive instructions from C&C server 150, as applicable.

In various embodiments, appliance 112 is configured to work in cooperation with a security platform (e.g., security platform 102). As one example, security platform 102 can provide to appliance 112 a set of signatures of known-malicious files (e.g., as part of a subscription). If a signature for malware 130 is included in the set, appliance 112 can prevent the transmission of malware 130 to client device 104 accordingly. As another example, security platform 102 can provide to appliance 112 a list of known malicious domains, allowing appliance 112 to block traffic between network 110 and (for example) C&C server 150. The list of malicious domains can also help appliance 112 determine when one of its nodes has been compromised. For example, if client device 104 attempts to contact C&C server 150, such attempt is a strong indicator that client device 104 has been compromised by malware (and remedial actions should be taken accordingly, such as quarantining client device 104 from communicating with other nodes within network 110).

In various embodiments, data appliance 112 includes a DNS module 114, which is configured to receive (e.g., from security platform 102) a list of domains (e.g., a list of attack domains) for which queries (e.g., made by client device 104), if observed (e.g., within network 110), are problematic. DNS module 114 can also be configured to send (e.g., to security platform 102) DNS query data (e.g., logs of DNS requests made by clients such as client devices 104-108). DNS module 114 can be integrated into appliance 112 (as shown in FIG. 1A) and can also operate as a standalone appliance in various embodiments. And, as with other components shown in FIGS. 1A-2, DNS module 114 can be provided by the same entity that provides appliance 112 (and/or security platform 102), and can also be provided by a third party (e.g., one that is different from the provider of appliance 112 or security platform 102). Further, as with other elements of appliance 112, in various embodiments, the functionality provided by DNS module 114 (or portions thereof) is instead/in addition provided by software executing on a client (e.g., client 104).

Figure 1B:
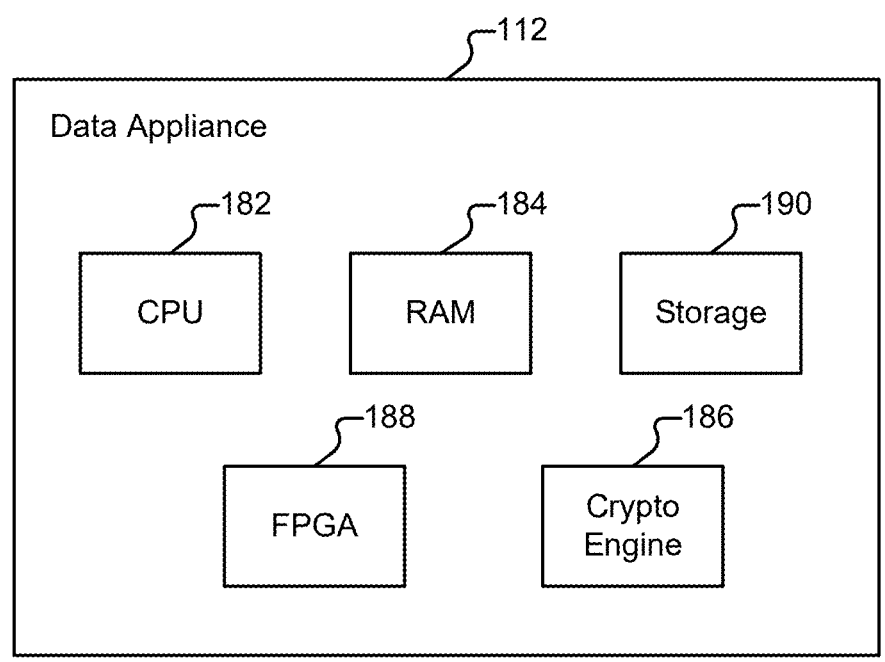
FIG. 1B illustrates an embodiment of a data appliance.

An embodiment of a data appliance is shown in FIG. 1B. The example shown is a representation of physical components that are included in data appliance 112, in various embodiments. Specifically, data appliance 112 includes a high performance multi-core Central Processing Unit (CPU) 182 and Random Access Memory (RAM) 184. Data appliance 112 also includes a storage 190 (such as one or more hard disks or solid state storage units). In various embodiments, data appliance 112 stores (whether in RAM 184, storage 190, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 112 can also include one or more optional hardware accelerators. For example, data appliance 112 can include a cryptographic engine 186 configured to perform encryption and decryption operations, and one or more Field Programmable Gate Arrays (FPGAs) 188 configured to perform matching, act as network processors, and/or perform other tasks.

Functionality described herein as being performed by data appliance 112 can be provided/implemented in a variety of ways. For example, data appliance 112 can be a dedicated device or set of devices. The functionality provided by data appliance 112 can also be integrated into or executed as software on a general purpose computer, a computer server, a gateway, and/or a network/routing device. In some embodiments, at least some services described as being provided by data appliance 112 are instead (or in addition) provided to a client device (e.g., client device 104) by software executing on the client device (e.g., endpoint protection application 180).

Whenever data appliance 112 is described as performing a task, a single component, a subset of components, or all components of data appliance 112 may cooperate to perform the task. Similarly, whenever a component of data appliance 112 is described as performing a task, a subcomponent may perform the task and/or the component may perform the task in conjunction with other components. In various embodiments, portions of data appliance 112 are provided by one or more third parties. Depending on factors such as the amount of computing resources available to data appliance 112, various logical components and/or features of data appliance 112 may be omitted and the techniques described herein adapted accordingly. Similarly, additional logical components/features can be included in embodiments of data appliance 112 as applicable. One example of a component included in data appliance 112 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 1C:
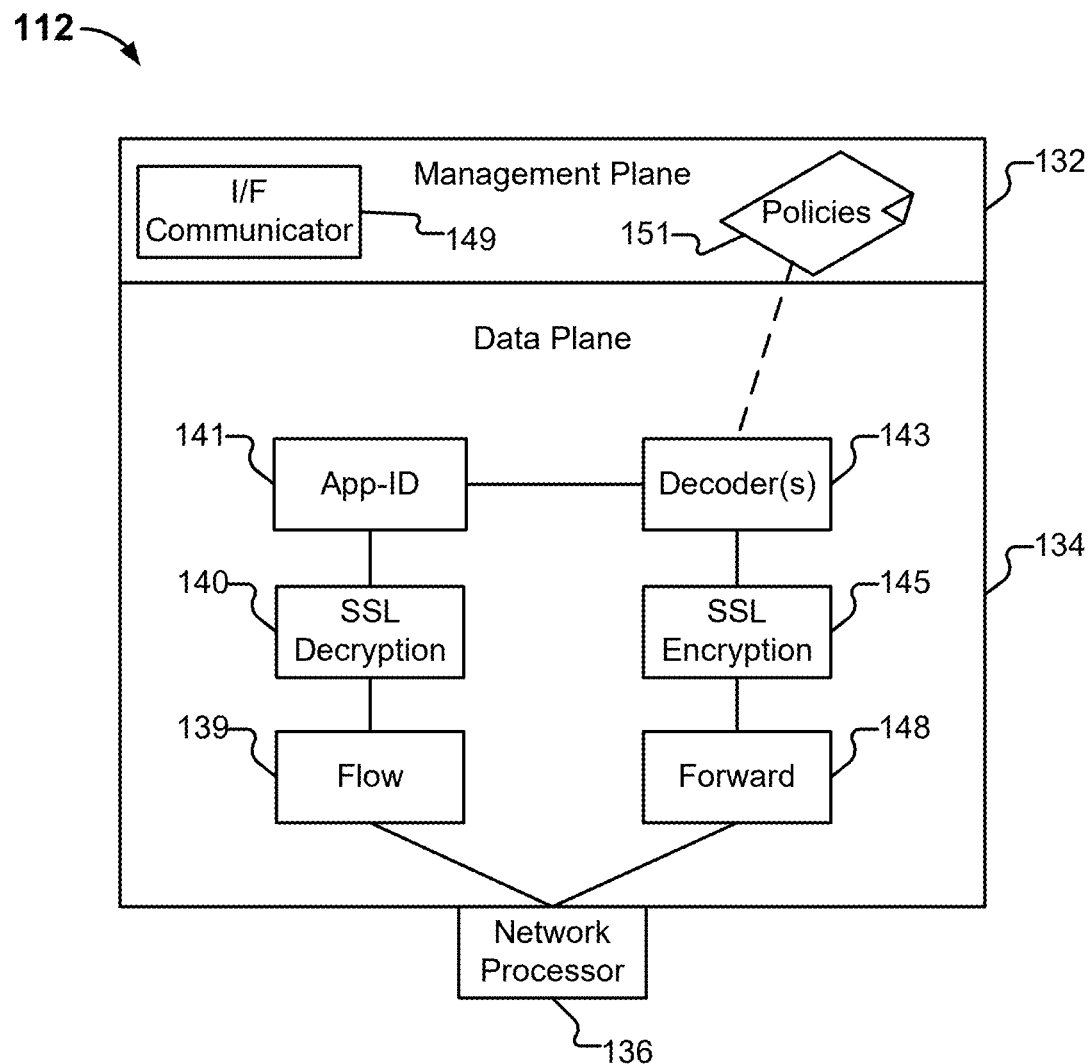
FIG. 1C is a functional diagram of logical components of an embodiment of a data appliance.

FIG. 1C is a functional diagram of logical components of an embodiment of a data appliance. The example shown is a representation of logical components that can be included in data appliance 112 in various embodiments. Unless otherwise specified, various logical components of data appliance 112 are generally implementable in a variety of ways, including as a set of one or more scripts (e.g., written in Java, python, etc., as applicable).

As shown, data appliance 112 comprises a firewall, and includes a management plane 132 and a data plane 134. The management plane is responsible for managing user interactions, such as by providing a user interface for configuring policies and viewing log data. The data plane is responsible for managing data, such as by performing packet processing and session handling.

Network processor 136 is configured to receive packets from client devices, such as client device 108, and provide them to data plane 134 for processing. Whenever flow module 139 identifies packets as being part of a new session, it creates a new session flow. Subsequent packets will be identified as belonging to the session based on a flow lookup. If applicable, SSL decryption is applied by SSL decryption engine 140. Otherwise, processing by SSL decryption engine 140 is omitted. Decryption engine 140 can help data appliance 112 inspect and control SSL/TLS and SSH encrypted traffic, and thus help to stop threats that might otherwise remain hidden in encrypted traffic. Decryption engine 140 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 141 is configured to determine what type of traffic a session involves. As one example, application identification engine 141 can recognize a GET request in received data and conclude that the session requires an HTTP decoder. In some cases, e.g., a web browsing session, the identified application can change, and such changes will be noted by data appliance 112. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 143.

Based on the determination made by application identification engine 141, the packets are sent to an appropriate decoder 143. Decoder 143 is configured to assemble packets (which may be received out of order) into the correct order, perform tokenization, and extract out information. Decoder 143 also performs signature matching to determine what should happen to the packet. As needed, SSL encryption engine 145 can re-encrypt decrypted data. Packets are forwarded using a forward module 148 for transmission (e.g., to a destination).

As also shown in FIG. 1C, policies 151 are received and stored in management plane 132. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 149 is provided for management communications (e.g., via (REST) APIs, messages, or network protocol communications or other communication mechanisms).

Figure 2:
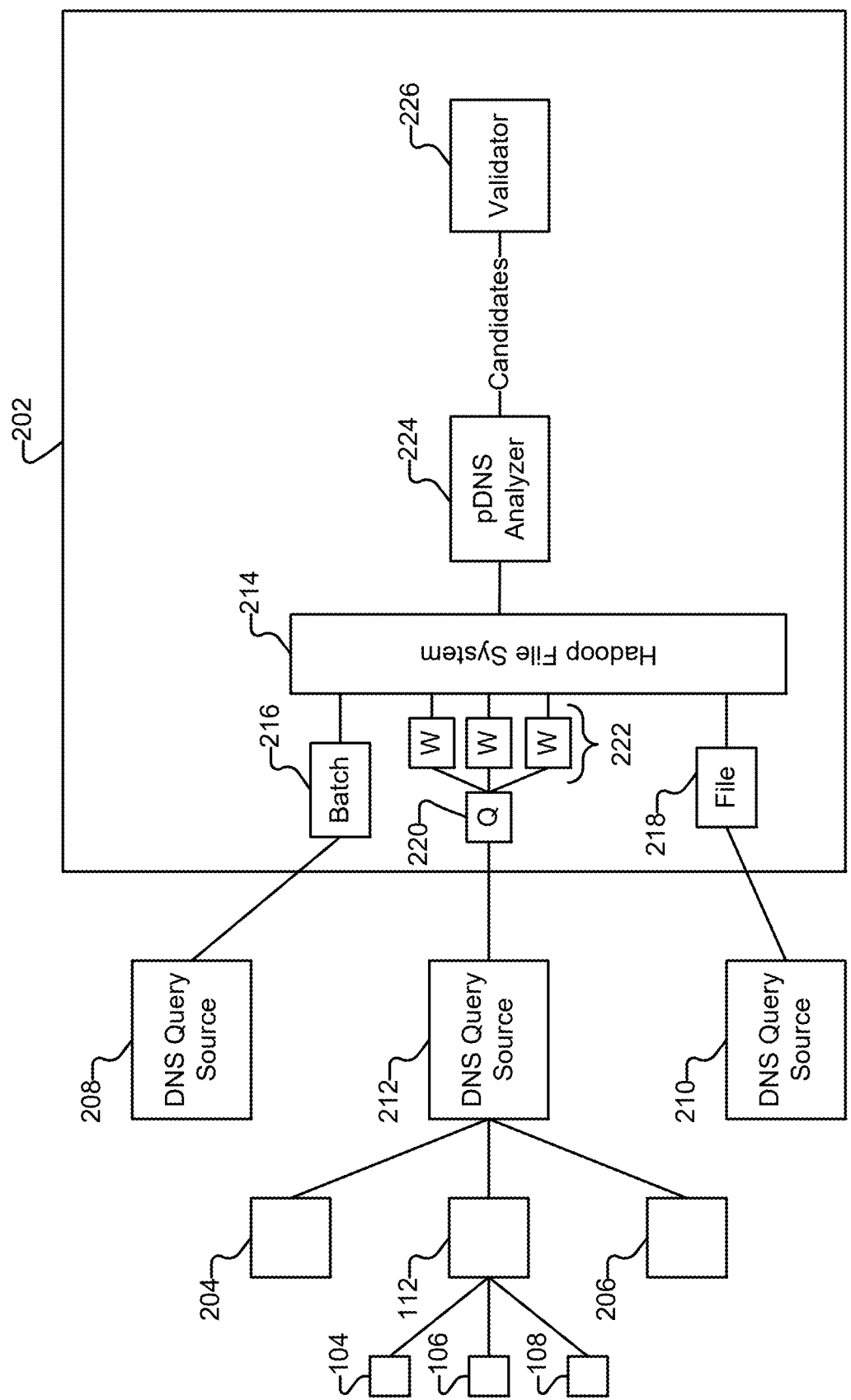
FIG. 2 illustrates an embodiment of a security platform.

FIG. 2 illustrates an embodiment of a security platform. Security platform 202 is an embodiment of security platform 102. Security platform 202 can be implemented in a variety of ways. As shown, security platform 202 makes use of commercially available public cloud resources, such as Amazon Web Services and/or Google Cloud Platform resources. Other platform resources provided by other vendors can also be used, as applicable (e.g., as offered by Microsoft), as can (in various embodiments) commodity server-class hardware.

Security platform 202 receives DNS query information (e.g., passive DNS data) from a variety of sources (208-212), using a variety of techniques. Sources 208-212 collectively provide platform 202 with approximately five billion unique records each day. An example of a record is:
    abc.com A 199.181.132.250 2022-01-01 12:30:49
The record indicates that, on Jan. 1, 2022, a DNS query was made for the site "abc.com" and at that time, the response provided was the IP address "199.181.132.250" (an "Address record" or "A record"). As used throughout the Specification, references to an "A record" can include both IPv4 (A) address records and IPv6 (AAAA) address records, based, for example, on implementation. In some cases, additional information can also be included. For example, an IP address associated with the requestor may be included in the passive DNS, or may be omitted (e.g., due to privacy reasons). Another example of a record is:
    xyz.abc.com NS ns.abc.com 199.123.12.12 2022-01-02 00:30:30
The record indicates that, on Jan. 2, 2022, a DNS query was made for the site "xyz.abc.com" and at that time, the response provided (also referred to as a "referral response" or "Nameserver (NS) record") was to query the nameserver at ns.abc.com for more information about "xyz.abc.com."

Source 208 is a real-time feed of globally collected passive DNS. An example of such a source is Farsight Security Passive DNS. In particular, records from source 208 are provided to platform 202 via an nmsgtool client, which is a utility wrapper for the libnmsg API that allows messages to be read/written across a network. Every 30 minutes, a batch process 216 (e.g., implemented using python) loads records newly received from source 208 into an Apache Hadoop cluster (HDFS) 214.

Source 210 is a daily feed of passive DNS associated with malware. An example of such a source is the Georgia Tech Information Security Center's Malware Passive DNS Data Daily Feed. Records from source 210 are provided to platform 202 as a single file via scp and then copied into HDFS 214 (e.g., using copyFromLocal on the file location 218 (e.g., a particular node in a cluster configured to receive data from source 210)).

As previously mentioned, appliance 112 can collect DNS queries made by clients 104-108 and provide passive DNS data to platform 202. In some embodiments, appliances such as appliance 112 directly provide the passive DNS information to platform 202. In other embodiments, appliance 112 (along with many other appliances) provides the passive DNS information to an intermediary, which in turn provides the information to platform 202. In the example shown in FIG. 2, appliance 112, along with other appliances, such as appliances 204 and 206 (and thousands of other appliances, not pictured), provide their collected DNS information to a server, which in turn provides the collected information (as source 212) to platform 202. In particular, source 212 provides the collected DNS information to a queue service 220 which in turn uses a set of workers 222 to copy records into HDFS 214. Other technologies can also be used to copy records into HDFS 214, such as Apache Kafka. In various embodiments, the DNS information provided to platform 202 arrives filtered (e.g., by data appliances such as data appliance 112, by server/source 212, or both). One example of such filtering includes filtering out DNS information associated with DNS requests for known benign domains, and/or popular websites. Domain whitelists (e.g., provided to appliance 112 by security platform 102) and the Alexa top 1,000 (or other) sites are examples of filters that can be used. Another example of a filter includes one specified by an administrator of appliance 112 (e.g., to prevent local DNS query information from leaving network 110).

III. Algorithmically Generated Domains

Returning to FIG. 1A, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose C&C server 150 is reachable by the domain "kjh2398sdfj.com," which the malware author registered on a Monday morning (e.g., at 00:01) using a stolen identity/credit card information. While malware 130 could explicitly include the domain "kjh2398sdfj.com" in its code, techniques such as static/dynamic analysis of malware 130 (e.g., as performed by security platform 102) could make it possible for a security company (or other applicable entity, such as a security researcher) to identify the domain "kjh2398sdfj.com" as associated with a C&C server, and take remedial actions (e.g., publish the domain "kjh2398sdfj.com" on a blacklist, and/or act to get the C&C server shut down/made unreachable). Further, if the domain "kjh2398sdfj.com" is hard coded into malware 130, once C&C server 150 is shut down, the malware author will potentially be unable to switch the command and control server used by malware 130 (e.g., switch the malware from contacting "kjh2398sdfj.com" to another, still reachable domain)—making the malware less useful to the malware author.

Instead of hard coding the domain "kjh2398sdfj.com" into malware 130, another approach is for the malware author to make use of algorithmically generated domains ("AGDs"). With AGDs, instead of trying to contact a specific, predetermined domain, malware 130 can programmatically generate multiple domain names and try to connect to each generated name in turn, until a successful connection is made. Further, the malware can continue to generate domain names, so that in the event "kjh2398sdfj.com" becomes no longer reachable, the malware can successfully contact the C&C server at a new domain.

In the following example, suppose malware 130 uses client device 104's system clock time as a seed, generates an ASCII string every five minutes, and then attempts to connect to the generated string (after adding an appropriate top level domain to the string, such as .com, as applicable). Malware 130 (e.g., when executing on a client device, such as client device 104) first generates "dwk2648vkwh.com" and attempts to connect to it Monday morning at 0:00. Since the malware author did not register "dwk2648vkwh.com" (and C&C server 150 is not reachable via "dwk2648vkwh.com"), no connection will be made to C&C server 150 by client device 104 via "dwk2648vkwh.com." At the next five minute mark, malware 130 (e.g., when executing on client device 104) will generate the domain "gwd4734qj5i.com" and attempt to connect to that domain (e.g., at 0:05). Malware 130 will continue generating domain names every five minutes (and attempting to connect to those domain names) until (e.g., at 1:15) it generates and is able to connect to "kjh2398sdfj.com" (which the malware author registered and brought online at 0:01 Monday).

Typically, a malware author will use a first domain (e.g., "kjh2398sdfj.com") for a period of time, such as two or three days (or a week), and then periodically switch the C&C server (or bring up other C&C servers, as applicable) to a new domain (e.g., "43hfd83hd3.com") to thwart efforts to shut the C&C server down/block access to the C&C server. The malware's domain generation algorithm will correspondingly generate the appropriate new, reachable, C&C domains (e.g., "43hfd83hd3.com") as well as other domains (e.g., every five minutes) that the author will not register-rotating through domain names the malware will use to successfully reach an appropriate C&C server. Since the author of malware 130 selected the domain generation algorithm (DGA) used by malware 130, the malware author is able to programmatically determine which domains will be generated by compromised machines (and at what date/time malware copies will attempt to communicate with those generated domains), and can therefore register a single appropriate domain for C&C use for a given time period. Typically, the malware author will register a new domain just before the domain is needed (e.g., within hours of when clients executing the domain generation algorithm would potentially start trying to connect to "43hfd833.com").

The AGDs generated by malware 130 appear (e.g., to a researcher or other observer) seemingly random, and as such are problematic for security companies, particularly where a large number of domains are generated within a short period of time by the malware. If a security company is able to determine how the AGDs are generated by a particular piece of malware, the security company could potentially take remedial actions with respect to those domains. Unfortunately, malware authors typically obfuscate their domain generation algorithms, and do so at a level of sophistication that makes reverse engineering the malware (and domain generation algorithm) in a timely manner difficult, if not impossible. For example, a talented security researcher may need to expend months of effort to reverse engineer a single domain generation algorithm. In contrast, malware authors can modify the workings of their domain generation algorithms with relative ease/speed (e.g., changing the algorithm each week). By the time the researcher has discovered how the domain generation algorithm works, the malware author can easily have switched to a new algorithm, meaning the researcher will likely have to start analysis of the new algorithm from scratch—again taking potentially months to discover how the new algorithm works. As will be described in more detail below, using techniques described herein, attempts to contact AGDs (e.g., by a compromised client device 104) can be efficiently detected, and a variety of remedial actions taken in response to their detection, without requiring a researcher to determine (e.g., via reverse engineering) how the algorithm used to generate the AGDs works.

A. DNS Resolution

The environment shown in FIG. 1A includes two Domain Name System (DNS) servers (122 and 124). As shown, DNS server 122 is under the control of ACME (for use by computing assets located within network 110), while DNS server 124 is publicly accessible (and can also be used by computing assets located within network 110 as well as other devices, such as those located within other networks). Enterprise DNS server 122 is configured to resolve enterprise domain names into IP addresses, and is further configured to communicate with one or more external DNS servers (e.g., DNS server 124) to resolve domain names as applicable.

In order to connect to a website 126 (e.g., www.example.com), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 126 using the IP address. Similarly, in order to connect to malicious C&C server 150, client device 104 will need to resolve the domain, "kjh2398sdfj.com," to a corresponding Internet Protocol (IP) address.

In various embodiments, data appliance 112 includes a DNS module 114, which is configured to facilitate determining whether client devices (e.g., client devices 104-108) are attempting to contact AGDs, and/or prevent connections (e.g., by client devices 104-108) to AGDs. DNS module 114 can be integrated into appliance 112 (as shown in FIG. 1A) and can also operate as a standalone appliance in various embodiments. And, as with other components shown in FIG. 1A, DNS module 114 can be provided by the same entity that provides appliance 112 (or security platform 102), and can also be provided by a third party (e.g., one that is different from the provider of appliance 112 or security platform 102). Further, in addition to preventing connections to known/suspected AGDs, DNS module 114 can take other actions, such as logging attempts by clients to access AGDs (an indication that a given client is compromised and should be quarantined, or otherwise investigated by an administrator).

In various embodiments, when a client device (e.g., client device 104) attempts to resolve a domain, DNS module 114 uses the domain as a query to security platform 102. This query can be performed concurrently with resolution of the domain (e.g., with the request sent to DNS servers 122 and/or 124, as well as security platform 102). As one example, DNS module 114 can send a query (e.g., in the JSON format) to a frontend 142 of security platform 102 via a REST API. Using processing described in more detail below, security platform 102 will determine (e.g., using AGD detector 138) whether the queried domain is an AGD and provide a result back to DNS module 114 (e.g., "non-AGD" or "AGD").

B. Differences Between Benign Domains and AGDs

AGDs will typically have different character distribution probabilities from benign domains. Often, benign domains will comprise actual words, or at least contain pronounceable groupings of characters (e.g., "wikipedia.org" and "amazon.com"). In contrast, AGDs will typically comprise random characters (e.g., "zkkfpkbbmihohix.com"). One approach to determining whether a domain is algorithmically generated is to evaluate its characters. In various embodiments, security platform 102 includes a Markov Chain analyzer 144 configured to evaluate the likelihood a given domain is an AGD.

Figure 3:
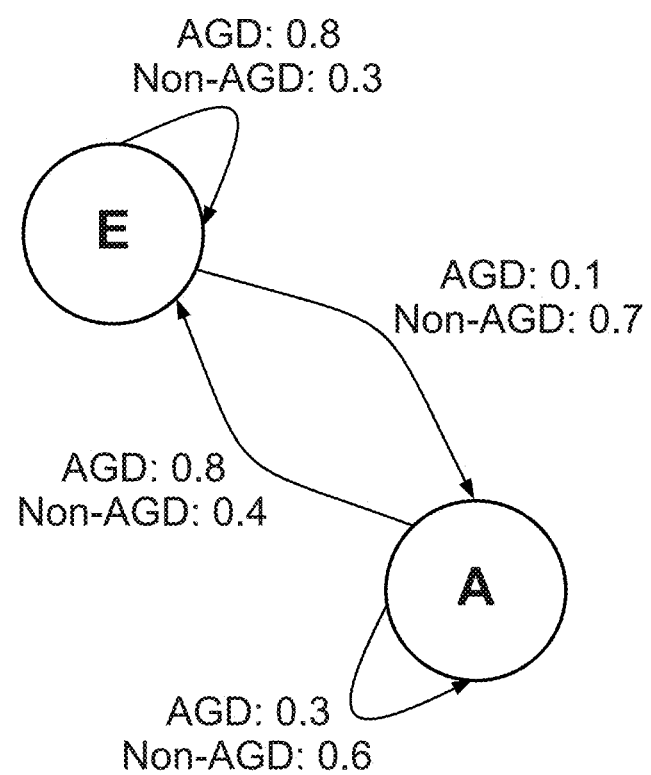
FIG. 3 depicts a visual representation of a portion of an example Markov Chain model.

A visual representation of a portion of an example Markov Chain model is depicted in FIG. 3. In particular, it depicts the respective probabilities of transitions involving "ee," "ea," "ae," and "aa" for both AGDs and benign domains. Such a Markov Chain model can be generated from training data comprising known benign domains and known AGDs. A score (e.g., −0.35) can be calculated for a given domain using the Markov Chain model, and a threshold applied (e.g., −0.44 or below) to assign a verdict of "benign" or "AGD" to the domain.

AGD analysis using a Markov Chain is fast enough that security platform 102 can provide realtime results to data appliance 112. Unfortunately, Markov Chain analysis can also result in false positives. As one example, a domain such as "exampleeee.com" which might in fact be a benign domain, might erroneously be flagged as an AGD using Markov Chain analysis.

Figure 4A:
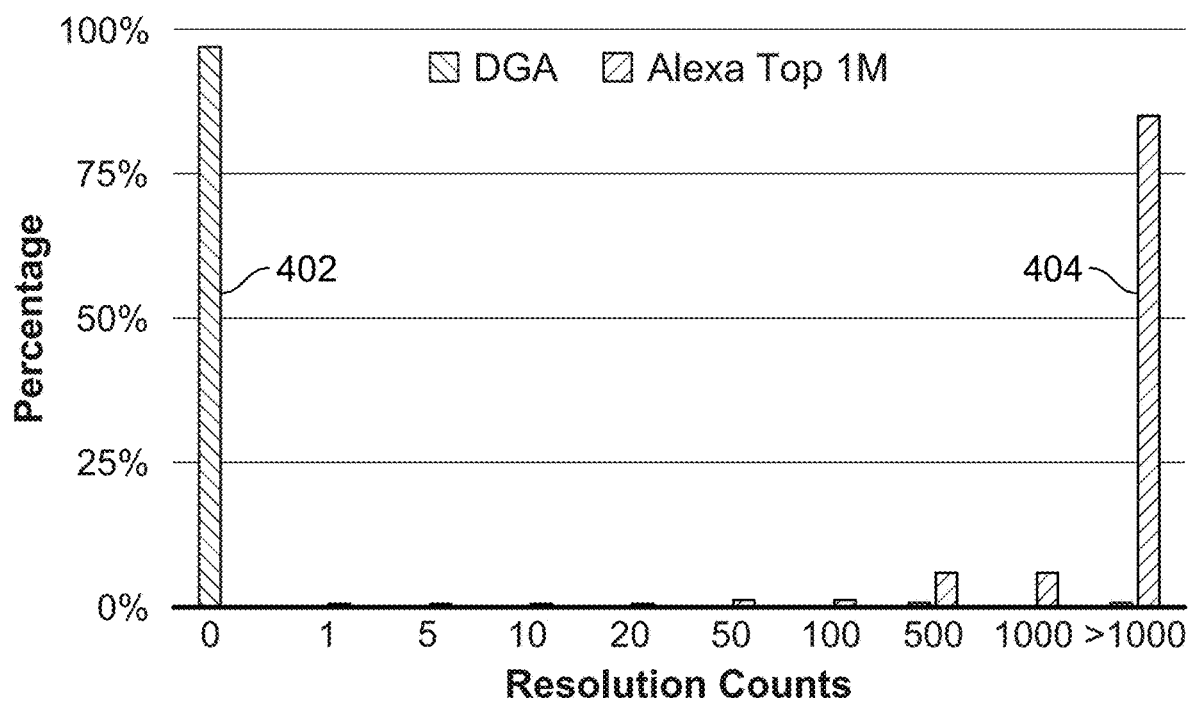
FIG. 4A illustrates examples of differences between resolution counts of algorithmically generated domains and benign domains.
Figure 4B:
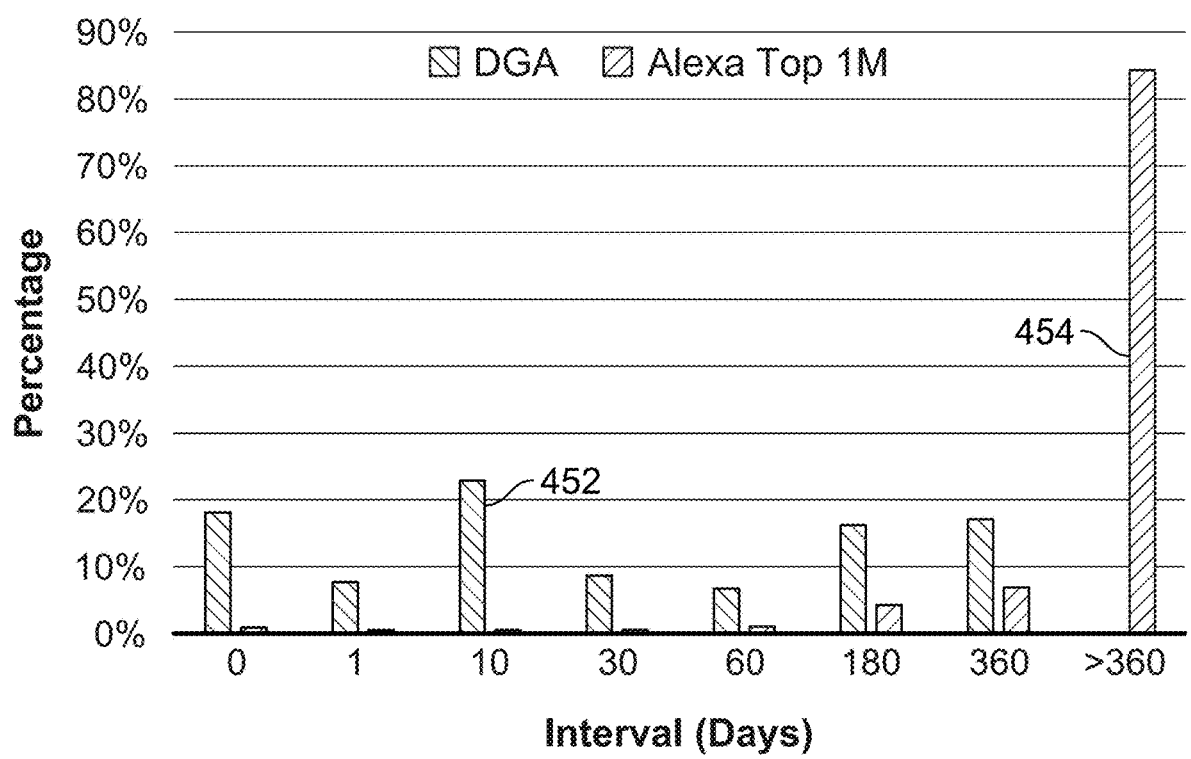
FIG. 4B illustrates examples of differences between resolution intervals algorithmically generated domains and benign domains.

In various embodiments, prior to returning a verdict of "AGD" in response to a query," AGD detector 138 evaluates historical information associated with the domain. As illustrated in FIGS. 4A and 4B, AGD and benign sites generally exhibit very different resolution statistics. For example, a given AGD will have very few (if any) successful resolutions (402) whereas a benign site, and in particular a popular site will have many resolutions (404). Further, the length of time between when an AGD is first resolved and was last resolved will typically be much shorter (452) than that of a benign domain (454). Such historical information can be used by AGD detector 138 to reduce false positives. As an example, when a domain is determined (by Markov Chain analyzer 144) to be an AGD, domain history checker 146 queries database 160 for resolution information associated with the domain. A final verdict for the domain can be determined by decision engine 152, using thresholds. As an example, suppose a given domain had a Markov Chain analysis score of −0.48. Such a score (below the threshold of −0.44) would cause Markov Chain analyzer 144 to flag the domain as an AGD. If the resolution count of the domain is above a given threshold (e.g., 20 or more resolutions) or the interval is above a given threshold (e.g., 1 year), the verdict of AGD can be overridden as a false positive.

C. Example Process

Figure 5:
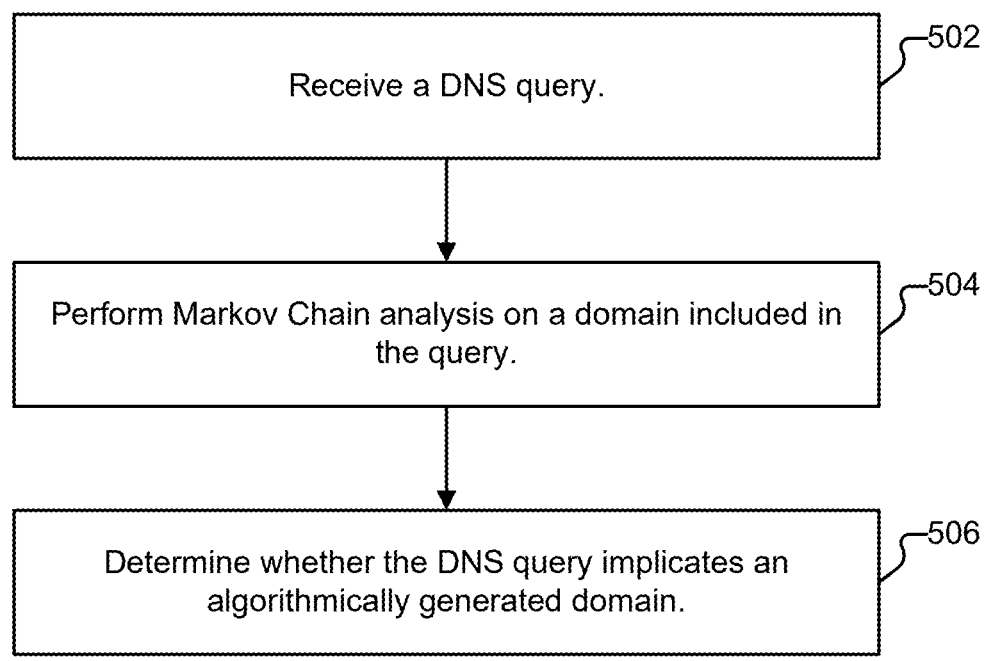
FIG. 5 illustrates an example of a process for detecting algorithmically generated domains.

FIG. 5 illustrates an example of a process for detecting algorithmically generated domains. In various embodiments, process 500 is performed by security platform 102. Process 500 can also be performed by other types of platforms/devices, as applicable, such as data appliance 112, client device 104, etc. Process 500 begins at 502 when a DNS query is received. As one example, a DNS query is received at 502 by frontend 142 when DNS module 114 receives (whether actively or passively) a DNS resolution request from client device 104. In some embodiments, DNS module 114 provides all DNS resolution requests as queries to security platform 102 for analysis. DNS module 114 can also more selectively provide such requests to platform 102. One example reason DNS module 114 might not query security platform 102 for a domain is where information associated with the domain is cached in data appliance 112 (e.g., because client device 106 previously requested resolution of the domain and process 500 was previously performed with respect to the domain). Another example reason is that the domain is on a whitelist/blacklist/etc., and so additional processing is not needed.

At 504, Markov Chain analysis is performed on the domain received at 502. One example way to perform such analysis is using a Markov Chain analyzer (144) authored in Go or another appropriate language. As discussed above, a Markov Chain model can be generated for use by Markov Chain analyzer 144 using training sets comprising known benign and known algorithmically generated domains.

At 506, a determination of whether the domain received at 502 implicates an algorithmically generated domain is made. As one example, decision engine 152 (authored in Go or another appropriate language) can return a "benign" verdict if Markov Chain analyzer 144 has determined (e.g., due to comparison of a score against a threshold) that the domain was not algorithmically generated. As discussed above, one potential drawback of exclusively using Markov Chain analyzer 144 for verdicts is that false positives can occur. In various embodiments, decision engine 152 also considers additional information before returning an AGD result. For example, decision engine 152 can apply a threshold to historical information stored in database 160 and retrieved by domain history checker 146 (also authored in Go or another appropriate language). An example of database 160 is a Redis database, and example information included in database 160 is each date/timestamp a request for a given domain was made, and whether resolution was successful (or other appropriate information such as the resolved IP address of the domain). The historical information stored in database 160 can be collected by security platform 102 (e.g., by collecting information from data appliance 112 and one or more other data appliances in communication with security platform 102) about resolution requests made by clients inside their respective networks. The historical information stored in database 160 can also at least partially be supplied by one or more third parties (e.g., provided by DNS server 124) as applicable.

A variety of actions can be taken in response to decision engine 152 determining that a domain is algorithmically generated. As one example, security platform 102 can respond to data appliance 112 with an appropriate result (e.g., a verdict of "AGD"). Data appliance 112 can then take actions based on policies 152 such as preventing communications between the client device (e.g., client device 104) and the AGD. Data appliance 112 can also take other actions, such as alerting an administrator that a given client device has attempted to contact an AGD (and thus may be compromised/having malware executing on it), quarantining the client device from other nodes on network 110, etc.

Security platform 102 can also take additional actions in response to decision engine 152 determining that a domain is algorithmically generated. As one example, security platform 102 can attempt to determine whether the domain belongs to a particular DGA family. This can be helpful in determining, e.g., the nature of malware that has (potentially) compromised client device 104. One approach to classifying a given domain into a family is to extract features associated with the domain, and use a machine learning model.

As shown in FIG. 1A, security platform 102 includes a DGA family labeler 154 (authored in python or another appropriate language). DGA family labeler 154 makes use of a random forest model 158 that was trained using information from a set of known DGA families. Examples of such features include what the TLD of the domain is (e.g., ".com" vs. ".so"), the number of occurrences of particular characters in the domain (e.g., the number of times "-" is used), the length of the domain, the number of distinct characters in the domain, the ratio of digits to non-digits in the domain, whether the first character of the root domain is a digit, etc. Such features can be extracted by feature extractor 156 (authored in python or another appropriate language). Other approaches can also be used, such as by applying heuristics, or using other types of machine learning models such as support vector machines, as applicable.

If the random forest model indicates a match between the domain and a known family, the domain can be associated with the family (e.g., as information stored in database 160) and other appropriate actions can be taken (e.g., alerting an administrator that client device 104 was seen exhibiting behavior associated with the particular family).

IV. Strategically Aged Domain Detection

A. Introduction

As described above, attackers often make use of command and control (C&C) servers to carry out attacks. In some attack scenarios, C&C domains are registered by the attacker just before launching an attack. In other attack scenarios (e.g., Advanced Persistent Threat (APT) attacks), attackers will instead register C&C domains long before launching attacking campaigns on them. Such "strategically aged domains" (registered well in advance of any active attacking) can be particularly problematic to detect because the longer life of aged domains can help them evade reputation-based detectors. Aged domains can also be used by other actors engaged in network abuses such as phishing and black hat search engine optimization, again benefiting in a perceived positive reputation built by the longevity of the registration.

APTs often initially penetrate networks broadly and then subsequently focus more effort on high-value targets. APT trojans may stay dormant in a victim's network until such time as an attacker decides on particular targets and exploits those targets actively. During the dormancy period, APT trojans may only send limited "heartbeat" traffic to their C&C servers. Once attackers decide to focus on particular targets (and start active exploits), the C&C domain will receive significantly more penetration traffic. As one example, the C&C domain used in the SolarWinds supply chain attack (avsmcloud[.]com) was registered in 2018 and stayed dormant for two years before carrying a high amount of attack traffic beginning in March 2020. The passive DNS traffic increased approximately 165× once the attack started.

Using techniques described herein, embodiments of security platform 102 can detect strategically aged domains. A variety of actions can be taken in response to detecting such domains, including performing additional analysis (e.g., to monitor for and/or determine suspicious or malicious activities), protecting client devices from connecting with such domains, and/or flagging attempts by clients to contact such domains (e.g., alerting administrators of networks such as network 110 to compromised client devices).

B. Detection

A domain's activity degree can be quantified by the volume of DNS traffic it receives in a specific time window. When a domain starts hosting a legitimate launched service, its traffic usually grows gradually. It is abnormal for a domain to stay in the dormant status for a long time and then suddenly get a large burst of traffic (e.g., on its awaken date).

In some embodiments, security platform 102 (e.g., using pDNS analyzer 224) uses two thresholds to divide the activity index range into three groups: dormant domains (those below the 75th percentile of the activity index), standard domains (those with traffic in the 75th and 95th percentile), and highly active domains (the top 5%). Other groupings and/or other thresholds can also be used. Security platform 102 can continuously monitor the traffic of dormant domains and identify when activity jumps significantly in a short time window. Such domains exhibiting this behavior can be flagged by security platform 102 as strategically aged domains. The index data can be stored in a variety of ways. As an example, it can be stored in filesystem 214. It can also be stored in database 160. Other metrics can also be determined and stored, such as an awaken date for the domain (which can be set to null for dormant domains that have not yet shown burst activity).

Figure 6:
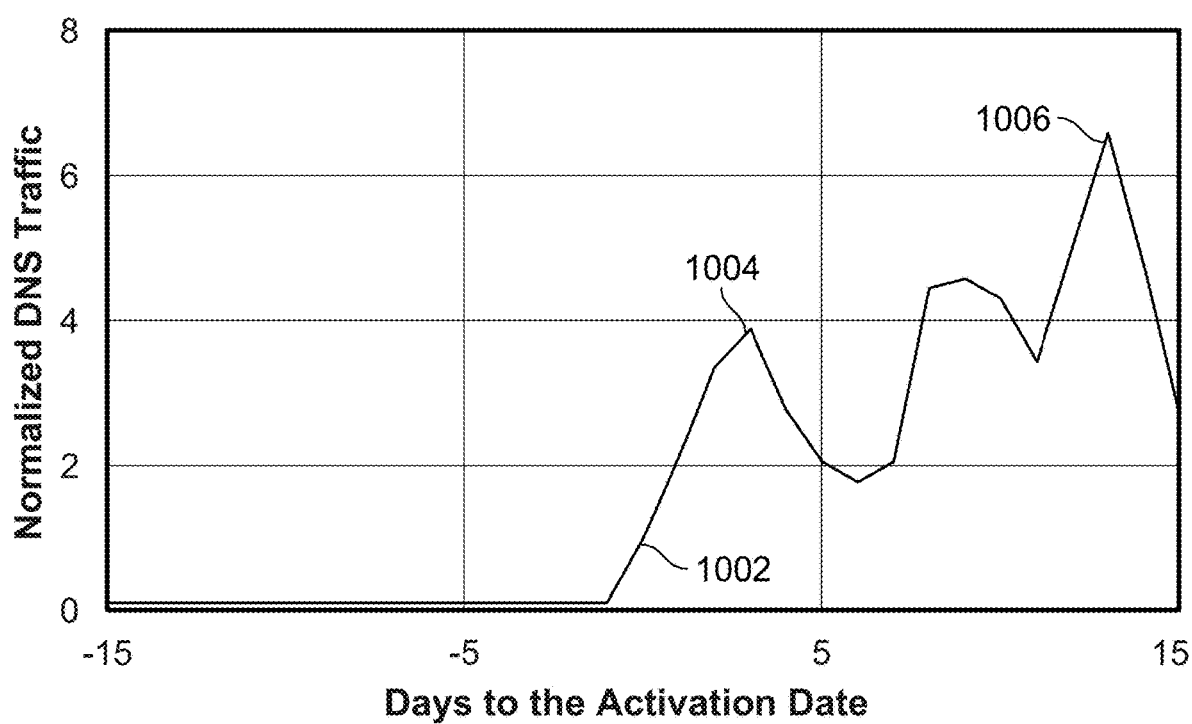
FIG. 6 illustrates normalized DNS traffic of an example strategically aged domain.

FIG. 6 illustrates normalized DNS traffic of an example strategically aged domain. In particular, FIG. 6 plots the average DNS traffic around the day (day zero—noted at 602 in FIG. 6) that the domain received burst traffic (the domain's "activation day"). The trend data is normalized based on the activation day's traffic (i.e., the normalized DNS traffic of day zero is 1). For an average/example strategically aged domain, traffic on activation day may be ten times more than a historical daily activity average for the domain. After that, the average daily traffic continues increasing and can reach, for example, six times above the activation day. For the plot shown in FIG. 6, 1.3 million daily DNS requests were received (by platform 102 from DNS modules such as DNS module 114) on the activation day. The site's traffic quadrupled on the third day after activation (604) and sextupled on the thirteenth day after activation (606). Other normalization schemes can also be used (as applicable).

C. Evaluation of Detected Strategically Aged Domains

Figure 7:
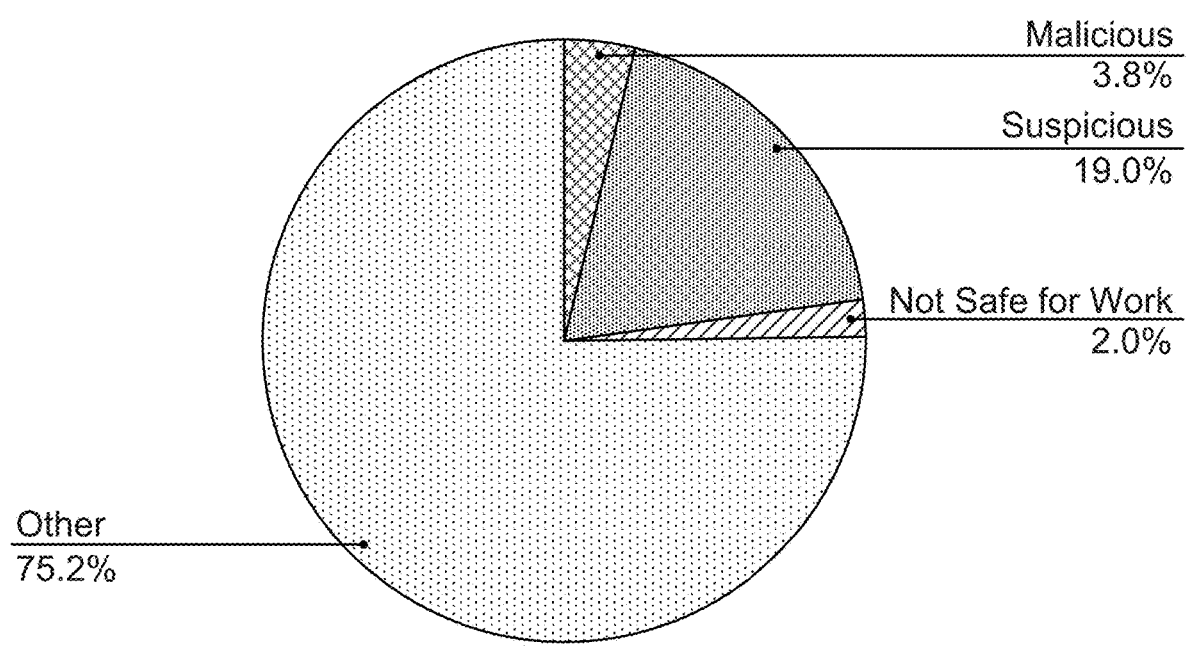
FIG. 7 illustrates an example category distribution of strategically aged domains.

Not all strategically aged domains are problematic. As an example, a conference organization or political candidate may defensively register a domain well in advance of a planned event (e.g., ElectJohnIn2028.com). Nonetheless, as illustrated in FIG. 7, an evaluation of approximately 30,000 strategically aged domains detected using techniques described herein determined that 24.8% of such domains were malicious, suspicious, or not safe for work. For comparison, out of the Alexa Top 1,000 domains, only 0.07% fall into one of these categories. Of note, the malicious rate (3.8%) is three times higher than has been observed of newly registered domains (i.e., domains registered within the last thirty days or similar time period).

A variety of approaches can be used to evaluate strategically aged domains. As a first example, security platform 102 can include a URL classification system, and any detected strategically aged domains can be provided to the URL classification system for evaluation. One or more third party sources can also be used to evaluate detected strategically aged domains, such as third party URL classification systems, or VirusTotal. In an example implementation, the "malicious" group includes domains that are malware, C&C, grayware, or phishing, or that have been detected by any VirusTotal vendor. The "suspicious" group includes domains categorized as parked, questionable, insufficient contact, or high risk. The "not safe for work" group includes domains related to nudity/adult content, gambling, etc.

In various embodiments, security platform 102 uses a combination of strategically aged domain detection and DNS traffic profiles of those detected domains to detect ongoing attacks (e.g., APT attacks). An example of how that can be accomplished follows (with reference to characteristics of the SolarWinds supply chain attack).

The SolarWinds supply chain attack leveraged DGA subdomains to exfiltrate data and provided a proxy layer for the attacking infrastructure. During the SolarWinds campaign's dormant stage, the SUNBURST trojan periodically contacted its C&C domain, avsvmcloud[.com], to report status and receive commands. This heartbeat communication was carried by static hostnames and the traffic volume was limited. However, when the C&C domain woke up from its incubation period, the majority of burst DNS requests were for new subdomains. The trojan dynamically constructed these hostnames with DGAs to exfiltrate data. Specifically, the subdomains were generated in the form DGAstring.appsync-api.region.avsvmcloud[.]com. The DGA strings encoded victims' identities, containing the infected organizations' domain names and security product statuses. When the attacker's DNS resolver received requests for these hostnames, it returned CNAME responses pointing to different C&C servers based on the exfiltrated information.

APT attacks similar to SolarWinds can be detected (e.g., by embodiments of security platform 102) by scanning hostnames of strategically aged domains and categorizing those that activate with a significant amount of emerging DGA domains as potential attacking domains. As the DGA subdomains are identified, they can be provided, e.g., as part of a subscription feed, to data appliances (such as data appliance 112) to protect networks (such as network 110). An example approach is to label any strategically aged domains that exhibit burst DNS requests to DGA subdomains as potential APT C&C domains. Filters can be used to recognize legitimate services based on additional information such as WHOIS records and benign hostname patterns.

Figure 8:
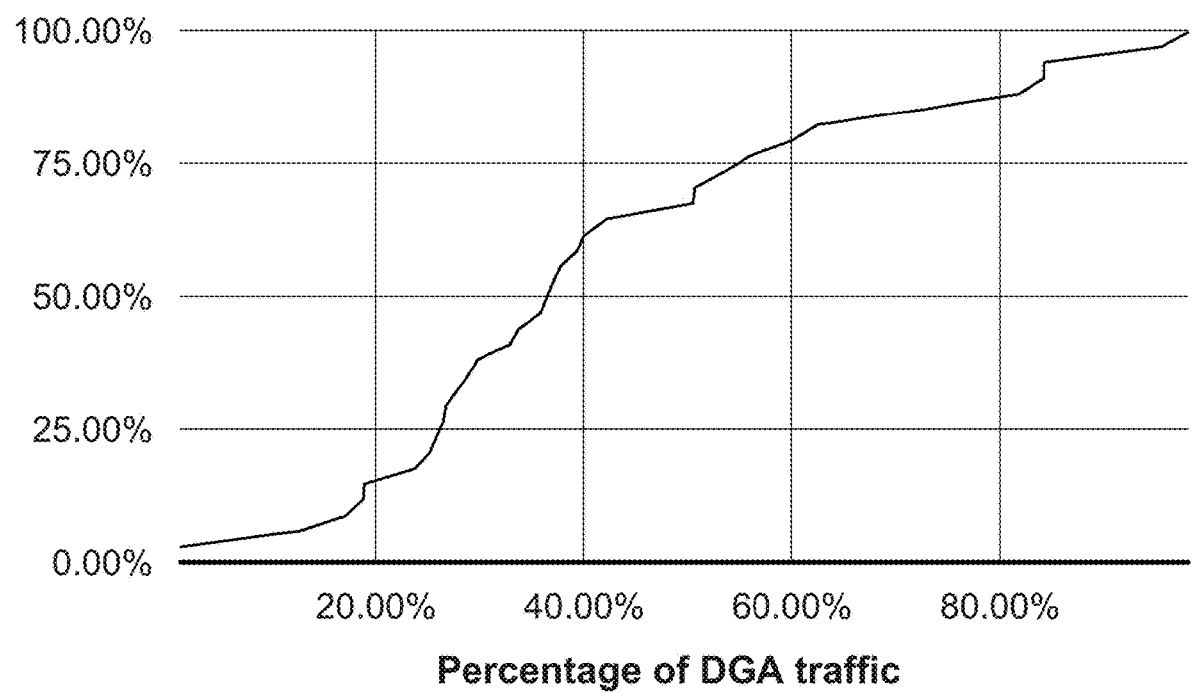
FIG. 8 illustrates an example cumulative distribution of detected strategically aged domains' DGA traffic rate.

FIG. 8 illustrates an example cumulative distribution of the DGA traffic rate for a set of detected strategically aged domains. An average example domain represented in FIG. 8, after the activation day, has approximately 160 DGA subdomains. The DGA traffic rate is higher than 36.76% for half of the domains.

Figure 9:
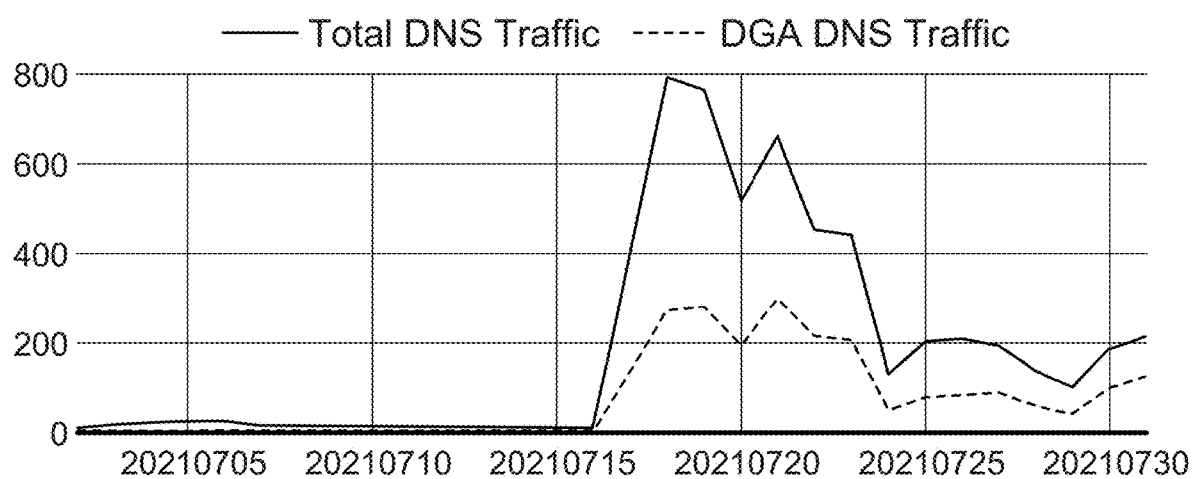
FIG. 9 illustrates an example of abnormal DNS traffic patterns.

FIG. 9 illustrates an example of abnormal DNS traffic patterns. In particular, FIG. 9 illustrates traffic patterns of the Pegasus spying campaign (e.g., as captured/analyzed by security platform 102). Pegasus spyware can infect mobile devices (e.g., running Android or iOS) to collect credential information and track user behaviors such as calls and geolocation history. Pegasus had two detected C&C domains, permalinking[.]com and opposedarrangement[.]net, both of which were registered in 2019 and awoke in July 2021 with a high percentage of DGA traffic. As shown in FIG. 9, there were approximately fifteen daily DNS requests to the campaign's domains before Jul. 18, 2021. On the activation day, the daily DNS traffic suddenly increased 56 times. The campaign made use of several DGA domains, such as imgdsg4f35.permalinking[.]com and php78mp9v.opposedarrangement[.]net, to carry C&C traffic. The amount of DGA traffic increased following the overall traffic trend. However, the percentage of DGA traffic increased significantly during the campaign—23.22% before Jul. 18, 2021 and 42.04% later.

D. Other Examples

As mentioned above, strategically aged domain detection techniques can be used to detect a variety of problematic sites, beyond APT threats. FIG. 10 illustrates a portion of a cloaking script of a bank phishing gateway hosted at uilio [.]cn. (URLs have been truncated in the example.) In addition to identifying C&C domains, security platform 102 can also expose phishing campaigns that produce DGA DNS traffic on strategically aged domains. In this example phishing attack, usage of the DGA subdomains is similar to that seen in the SolarWinds supply chain attack. The DGA subdomains are used to provide a proxy layer in front of the actual malicious websites. For example, the script shown in FIG. 10 (hosted on one of the gateway hostnames) forwards the visitor to another phishing DGA domain when a specific parameter exists in the URL. Otherwise, it redirects to the legitimate bank's website. This DGA subdomain is a cloaking layer that hides the actual phishing content from unwanted visitors and crawlers. An embodiment of security platform 102 observed an abnormal increment of traffic to the DGA subdomains of uilio[.]cn.

Apart from gateway hostnames, phishing campaigns can use DGA strings to generate levesquatting hostnames. These strings can separate deceptive sections and root domains. For example, the domain mailingmarketing[.]net was created in 2020. An embodiment of security platform 102 identified it as a strategically aged domain having 47 new AGD subdomains including uk.id.login.update.ssl.encryption-6159368de39251d7a-login.id.security.trackid. piwikb7c1867dd7ba9c57.fd685e42f1d69c71708ff5 49fea71274.mailing marketing[.]net. The subdomains hosted a fake virus scanning page. They are so long that victims may only notice the front sections and think they are legitimate encrypted login services, neglecting to check the root domain in the end. This is especially likely for mobile users-mobile browsers will fail to display the fully qualified domain name (FQDN) in the address bar, but instead only show the truncated string in the beginning.

As another example (wildcard abuse), an embodiment of security platform 102 can be used to identify gray services that leverage DGA subdomains to build their infrastructure. As an example, fiorichiari[.]com has a wildcard DNS record to point all of its subdomains to the same IP address. The service operator registered the domain on Jul. 27, 2021. Burst DNS requests for its DGA subdomains began Sep. 29, 2021. These hostnames serve randomly generated websites that fill out some website templates with random strings. They could be used for black hat search engine optimization. Specifically, these web pages link to each other to obtain a high rank from search engine crawlers without providing valuable information.

E. Example Process

Figure 11:
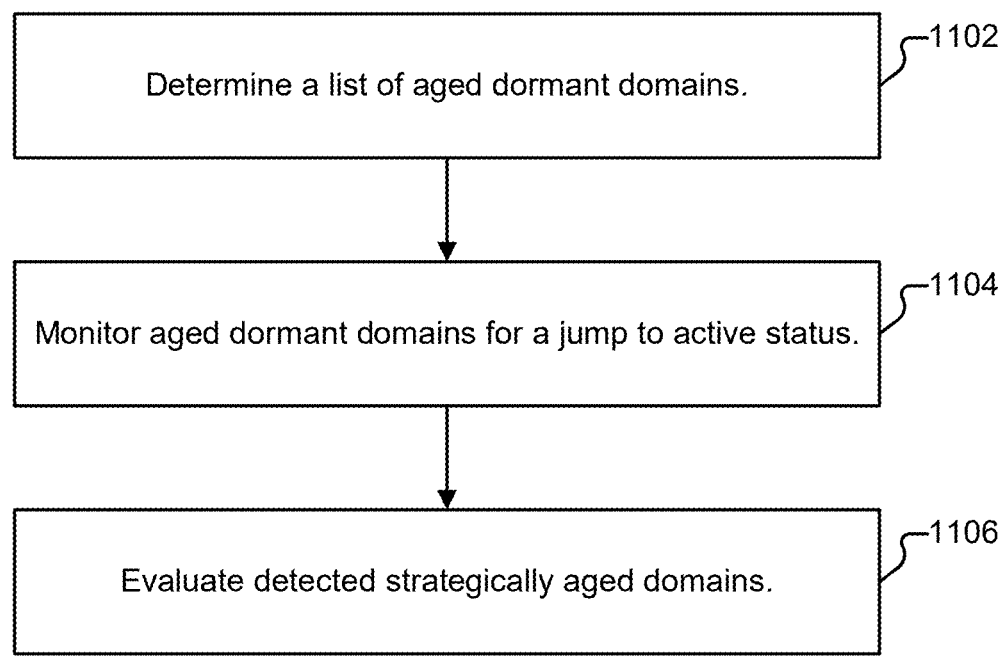
FIG. 11 illustrates an example of a process for detecting a strategically aged domain.

FIG. 11 illustrates an example of a process for detecting a strategically aged domain. In various embodiments, process 1500 is performed by platform 202, and in particular by pDNS analyzer 224 working in concert with validator 226 or embodiments thereof (or other appropriate modules/scripts as applicable).

The process begins at 1102 when a list of aged dormant domains is determined. An example way of determining such domains is by evaluating passive DNS information for a list of domains for which the average daily DNS requests are below the 75th percentile of an activity index within a particular time window. A domain which has, for example, average daily traffic below the 75th percentile of the index for one year could be included in the list of dormant domains by platform 202. The list of aged dormant domains can be updated frequently (e.g., once per day) to add new domains, and those domains on the list monitored (1104) to determine whether they suddenly indicate significant activity. An example way of defining a domain as strategically aged is if, after being classified as dormant for at least a year, it is observed to have jumped to highly active (e.g., top 5% of traffic) within a recent time frame (e.g., last few days). As mentioned above, not all strategically aged domains represent threats (and/or represent different degrees of threat). Accordingly, in various embodiments, the strategically aged domains detected at 1106 are evaluated. Also as mentioned above, a variety of techniques can be used to evaluate detected strategically aged domains. Examples include AGD/DGA analysis (e.g., by embodiments of AGD detector 138) and URL classification analysis (either by security platform 102 and/or by one or more third party assessment services). Machine learning and/or heuristic approaches can also be used. Examples of features/metrics that can be collected by security platform 102 and used in analysis include, for example, awaken date and, once a domain is awakened—statistics such as average daily traffic, number of subdomains, number of IP addresses, etc. can be computed and compared between pre-awakening values and post-awakening values (such as number of DGA subdomains before activation and DGA domains after activation).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine, as a list of candidate strategically aged domains, a set of initially benign aged dormant domains, including by evaluating passive Domain Name System (DNS) information;
monitor the list of candidate strategically aged domains for a change by a particular domain from a dormant status to an active status, at least in part by determining that a threshold volume of DNS traffic for the particular domain has been exceeded; and
in response to determining the change to active status of the particular domain, take a remedial action with respect to the particular domain; and
a memory coupled to the processor and configured to provide the processor with instructions.

2. The system of claim 1, wherein taking the remedial action includes determining whether the particular domain is associated with an algorithmically generated domain.

3. The system of claim 2, wherein determining whether the particular domain is associated with the algorithmically generated domain includes performing Markov chain analysis.

4. The system of claim 2, wherein determining whether the particular domain is associated with the algorithmically generated domain includes evaluating a DNS traffic pattern for an abnormality.

5. The system of claim 1, wherein taking the remedial action includes determining whether the particular domain is associated with a phishing attack.

6. The system of claim 1, wherein taking the remedial action includes determining whether the particular domain is associated with wildcard DNS abuse.

7. The system of claim 1, wherein taking the remedial action includes adding the particular domain to a block list.

8. The system of claim 1, wherein taking the remedial action includes responding to a DNS query with an indication that a DNS request indicates that a client has been compromised.

9. The system of claim 1, wherein determining the list includes determining whether an average DNS request for a given domain is below a threshold for a given time window.

10. The system of claim 1, wherein monitoring the list of candidate strategically aged domains includes determining whether an average DNS request for a given domain is above a threshold within a time window.

11. The system of claim 1, wherein the processor is further configured to collect a first set of metrics quantifying activities associated with the particular domain prior to changing status and collect a second set of metrics quantifying activities associated with the particular domain after changing the status.

12. A method, comprising:
- determining, as a list of candidate strategically aged domains, a set of initially benign aged dormant domains, including by evaluating passive Domain Name System (DNS) information;
- monitoring the list of candidate strategically aged domains for a change by a particular domain from a dormant status to an active status, at least in part by determining that a threshold volume of DNS traffic for the particular domain has been exceeded; and
- in response to determining the change to active status of the particular domain, taking a remedial action with respect to the particular domain.

13. A computer program product embodied in a non-transitory computer readable medium and comprising computer instructions for:
- determining, as a list of candidate strategically aged domains, a set of initially benign aged dormant domains, including by evaluating passive Domain Name System (DNS) information;
- monitoring the list of candidate strategically aged domains for a change by a particular domain from a dormant status to an active status, at least in part by determining that a threshold volume of DNS traffic for the particular domain has been exceeded; and
- in response to determining the change to active status of the particular domain, taking a remedial action with respect to the particular domain.

14. The method of claim 12, wherein taking the remedial action includes determining whether the particular domain is associated with an algorithmically generated domain.

15. The method of claim 14, wherein determining whether the particular domain is associated with the algorithmically generated domain includes performing Markov chain analysis.

16. The method of claim 14, wherein determining whether the particular domain is associated with the algorithmically generated domain includes evaluating a DNS traffic pattern for an abnormality.

17. The method of claim 12, wherein taking the remedial action includes determining whether the particular domain is associated with a phishing attack.

18. The method of claim 12, wherein taking the remedial action includes determining whether the particular domain is associated with wildcard DNS abuse.

19. The method of claim 12, wherein taking the remedial action includes adding the particular domain to a block list.

20. The method of claim 12, wherein taking the remedial action includes responding to a DNS query with an indication that a DNS request indicates that a client has been compromised.

21. The method of claim 12, wherein determining the list includes determining whether an average DNS request for a given domain is below a threshold for a given time window.

22. The method of claim 12, wherein monitoring the list of candidate strategically aged domains includes determining whether an average DNS request for a given domain is above a threshold within a time window.

23. The method of claim 12, further comprising collecting a first set of metrics quantifying activities associated with the particular domain prior to changing status and collecting a second set of metrics quantifying activities associated with the particular domain after changing the status.

* * * * *